June 23, 1942. E. G. EBY 2,287,472
CRANKSHAFT AND CONNECTING ROD CONNECTION
Filed March 22, 1941
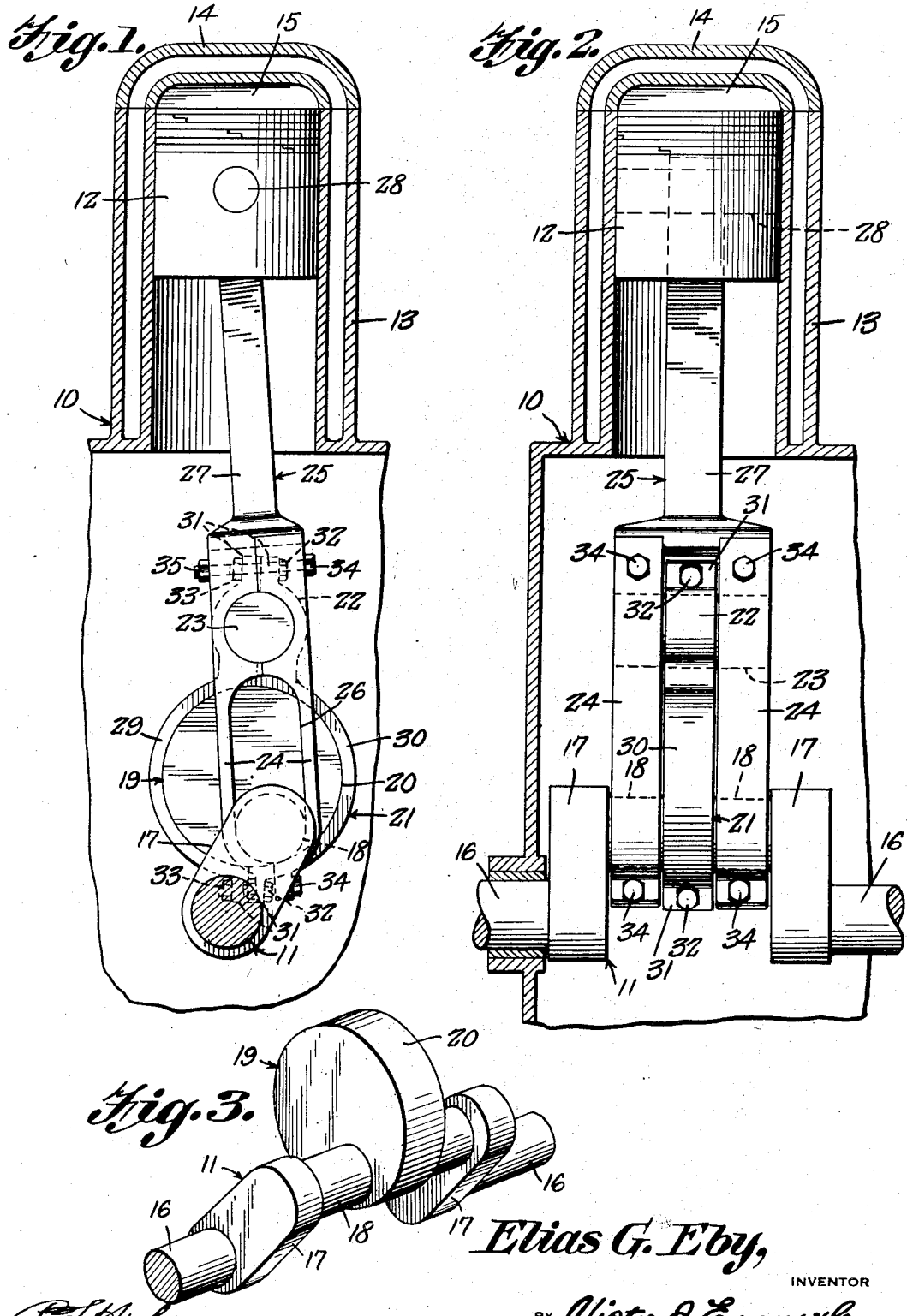
Elias G. Eby,
INVENTOR
BY Victor J. Evans & Co.
ATTORNEYS
P. S. Hickey.
WITNESS Patented June 23, 1942

2,287,472

UNITED STATES PATENT OFFICE 2,287,472

CRANKSHAFT AND CONNECTING ROD CONNECTION

Elias G. Eby, Pharr, Tex.

Application March 22, 1941, Serial No. 384,734

6 Claims. (Cl. 74—44)

My invention relates broadly to internal combustion engines and more particularly to new and useful improvements in coupling means for operatively connecting the crank shaft of the engine with the pistons thereof.

In the operation of internal combustion engines, it is necessary to cause ignition of the gases in each of the cylinders at the moment of highest compression if maximum power and efficiency is to be obtained. In other words, the ignition system of the engine must be timed so that the charge of gas in each cylinder is fired when the piston is at, or substantially at, the limit of its upward movement in the cylinder. In present day high speed engines, the firing of the fuel charge in any particular cylinder occurs slightly before the crank shaft reaches top dead center with respect to the cylinder, the momentum of the crank shaft and of the fly wheel carried thereby being relied upon to carry the crank shaft around in order to prevent the motor from stopping on dead center or from kicking back at the moment the explosion occurs.

From the above described relation of the parts it will be apparent that at the moment the charge of fuel is ignited, the initial force developed by the explosion of the gases in the compression chamber is wasted or lost by reason of the fact that the power is expended along the connecting rod in a direct line with the crank shaft. This loss of power also occurs when the crank shaft is only a few degrees past dead center, maximum efficiency not being obtained until the crank shaft reaches a sufficient distance to permit the explosive forces to be expended in driving the crank webs downwardly instead of laterally. It is, therefore, desirable to have the explosion occur when the crank shaft is well past dead center so that the entire force of the explosion may be utilized in the application of a turning force upon the crank shaft. In present day engine constructions of the type wherein the connecting rod is journaled directly to the crank shaft, if the explosion is timed to occur when the crank is past dead center, the explosion will occur when the gases are not at peak compression and hence will not develop the maximum possible pressure.

An important object of my invention, therefore, is to provide an internal combustion engine constructed to obtain a maximum of power from the fuel used, the above result being obtained by uniquely connecting the crank shaft with the piston in such a manner that the crank shaft will be well beyond dead center by the time the piston reaches the limit of its compression stroke, whereby the peak pressure will be developed simultaneously with the movement of the crank shaft into a position to permit a maximum of power to be developed.

Another object of my invention is the provision of a unique means for connecting the piston to the crank shaft which will permit the piston to have a relatively long stroke for a given throw of the crank whereby increased power may be developed by reason of the essentially longer leverage of the connecting rod.

Still another object of my invention is the provision of a connection of the above-mentioned character wherein lateral pivoting of the connecting rod is reduced to a minimum.

Yet another object of my invention is the provision of a connection of the above-mentioned character that is simple and strong in its construction to reduce the possibility of mechanical troubles to a minimum.

Other objects and advantages of my invention will be apparent during the course of the following description.

In the drawing, forming a part of this specification, and wherein like numerals are employed to designate like parts throughout the same, Figure 1 is a longitudinal vertical sectional view of an internal combustion engine, showing parts in section and parts in elevation, and illustrating my improved coupling means for connecting the crank shaft with the piston, Figure 2 is a transverse sectional view thereof, and Figure 3 is a fragmentary perspective view of a crank shaft constructed in accordance with my invention.

In the accompanying drawing, wherein for the purpose of illustration, is shown a preferred embodiment of my invention, the numeral 10 designates an internal combustion engine of conventional construction. Only a fragmentary portion of the engine is here illustrated, such parts of the engine being shown as are necessary to properly illustrate my improved means for coupling the crank shaft 11 with a piston 12. The piston is mounted for reciprocation within the cylinder 13 of conventional construction, which cylinder is closed by a cylinder head 14 and which head is formed to provide the usual combustion chamber 15.

The crank shaft is arranged below the cylinders in the conventional manner and includes journals 16 carrying crank webs 17 which are connected by the crank pin 18. The crank thus formed in the crank shaft by the crank webs 17 and crank pin 18 is disposed directly below the cylinder 13 and an eccentric 19 is fixedly mounted at the center of the crank pin. The crank webs are disposed in spaced parallel relation and are adapted to rotate in a clockwise direction about the journals 16. As best illustrated in Figures 1 and 3, the major axis of the eccentric is inclined slightly in an anti-clockwise direction relative to the longitudinal centers of the crank webs and the eccentric is formed with a flat peripheral face 20 which rotatably accommodates the eccentric strap 21. The eccentric strap is formed with a radially extending arm 22 which pivotally receives the transversely extending pivot pins 23. The ends of the pin extending beyond the arm portion of the eccentric strap are journaled in the bifurcated arm portions 24 of the connecting rod 25, which arms extend in embracing relation with the eccentric and receive the portions of the crank pin at the opposite sides thereof in elongated slots 26. The portion of the connecting rod extending upwardly from the arm portions 24 comprises a single unitary stem 27 which is attached to the piston by the usual wrist pin connection 28.

To facilitate assembling of the above parts I prefer that the eccentric strap 21 be longitudinally divided to provide separate parts 29 and 30, each of which parts is provided at its opposite ends with extending ears or tabs 31 joined by means of the bolts 32 and nuts 33. The arm portions 24 of the connecting rod may also be advantageously formed in sections in the manner best illustrated in Figure 1 to facilitate the assembling of the arrangement, which sections may be fixedly secured to each other by means of the bolts and nuts 34 and 35, or the like.

From the foregoing, it will be readily apparent that the stroke of the piston will be determined by the distance between the centers of the crank shaft journals 16 and the center of the eccentric disk 19, while the lateral swinging or pivotal movement of the connecting rod will be determined by the distance between the center of the crank shaft journals 16 and the center of the crank pin 18. An inspection of the drawing will make it readily apparent that the first-mentioned distance is substantially greater than the second-mentioned distance whereby the piston will have an essentially long stroke for the length of the crank webs. By reducing the pivotal movement of the connecting rod to a minimum, friction between the parts will be materially reduced and the connecting rod will be able to more efficiently transmit power developed by the explosion of the fuel in the combustion chamber 15 to the crank shaft. This efficiency of operation will be materially enhanced by the increased leverage afforded the piston by the increased length of the piston stroke.

Another important feature of the invention is the fact that the crank webs 17 will be well beyond dead center when the piston reaches the limit of its compression stroke. When the crank webs reach the top dead center position, the major axis of the eccentric to which the connecting rod is directly attached through the medium of the eccentric strap 21, will be inclined substantially from the vertical so that the piston will still have a substantial distance to travel on its compression stroke. As the crank webs rotate beyond top dead center, the ends thereof carrying the crank pin, will move a relatively great distance in a horizontal direction and but a slight distance in a vertical direction. While the crank webs will move a slight distance downwardly to lower the piston in its cylinder, this lowering tendency will be more than compensated for by the fact that the major axis of the eccentric is swinging upwardly and approaching a vertical position. Thus, the piston will continue on its compression stroke even after the crank shaft has passed top dead center and is beginning to rotate downwardly. The ignition system of the engine is adjusted to ignite the fuel in the compression chamber when the piston reaches the end of its compression stroke, and upon the occurrence of this event, the parts connecting the piston with the crank shaft will be in the relative position illustrated in Figures 1 and 2. When the parts are thus positioned, it is readily apparent that the power developed by the explosion of the fuel charge in the compression chamber will be expended along the connecting rod to the crank shaft. In present day engine construction, the connecting rod is either in a vertical position or approaching a vertical position when the peak pressure of the fuel charge is developed. This relation of the parts effects a severe strain on the crank shaft and connecting rod upon ignition of the fuel charge for the reason that the power impulse of the ignited fuel is expended along the connecting rod when the rod and the crank webs are both in a vertical or substantially vertical position. Therefore, when the crank webs have rotated substantially beyond the top dead center position and when the connecting rod has shifted slightly from the vertical, the power of the exploding fuel in the combustion chamber will be more effectively transmitted to the crank shaft in a manner to produce rotation thereof than would occur if the crank shaft and connecting rod were both in the top dead center position.

The slots 26 in the connecting rod arms 24 permit the crank pin 18 of the crank shaft to move relative to the arms during the travel of the eccenrtic about the crank pin and the engagement of the arms with the crank pin prevents the independent movement of the eccentric strap about the eccentric. The manner in which the parts comprising the coupling mutually interconnect, provides an essentially strong construction, whereby to reduce to a minimum any possibility of mechanical troubles.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. In combination, a cylinder, a piston operating within said cylinder, a connecting rod pivotally attached to the piston, a crank shaft having a crank formed thereon, an eccentric fixedly mounted on the crank portion of the crank shaft, arms having one end secured to the connecting rod and the other end thereof formed with slots for receiving the crank portion of the crank shaft whereby to permit the crank to have a limited sliding movement relative thereto, and a strap having one end mounted for rotation on the eccentric and the other end thereof extending radially outwardly from the eccentric and being pivotally attached to the said arms.

2. In combination, a cylinder, a piston operating within said cylinder, a connecting rod pivotally attached to the piston, a crank shaft having a crank formed thereon, an eccentric carried by the crank portion of the crank shaft, arms carried by the connecting rod extending in embracing relation to the eccentric and loosely connecting with the crank portion of the crank shaft whereby to permit the crank to have a limited sliding movement relative thereto and a strap mounted for rotation on the eccentric, and extensions projecting radially from the strap and pivotally connecting with the said arms.

3. In an external combustion engine having a cylinder, a piston mounted for reciprocation within the cylinder, a connecting rod pivotally attached to the piston, and a crank shaft for driving the piston; means connecting the crank shaft and connecting the rod comprising an eccentric fixedly mounted on the crank pin of the crank shaft, arms carried by the connecting rod extending in embracing relation with the eccentric and loosely connecting with the crank pin, and a strap mounted for rotation about the eccentric and having end portions extending radially from the eccentric between the arms and pivotally connecting with the said arms.

4. In an internal combustion engine having a cylinder, a piston mounted for reciprocation within the cylinder, and a crank shaft for driving the piston; means connecting the crank shaft and piston comprising an eccentric fixedly mounted on the crank pin of the crank shaft, a connecting rod pivoted to the piston having bifurcations extending in embracing relation with the eccentric, the ends of the bifurcations having elongated slots loosely receiving the crank pin, and a strap mounted for rotation about the eccentric and pivotally connecting with the bifurcations of the connecting rod.

5. In an internal combustion engine having a cylinder, a piston mounted for reciprocation within the cylinder, and a crank shaft for driving the piston; means connecting the crank shaft and piston comprising an eccentric fixedly mounted on the crank pin of the crank shaft and with its major axis disposed in slight angular relation with the crank web thereof, a connecting rod having one end pivotally attached to the piston and the other end thereof being bifurcated, said bifurcations extending in embracing relation with the eccentric and having a slotted connection with the crank pin, and a strap mounted for rotation about the eccentric and pivotally connecting with the bifurcations of the said connecting rod whereby the crank webs will be substantially beyond top dead center when the piston completes its compression stroke.

6. In an internal combustion engine having a cylinder, a piston mounted for reciprocation within the cylinder, and a crank shaft for driving the piston; means for connecting the crank shaft and piston comprising an eccentric fixedly mounted on the crank pin of the crank shaft with its major axis inclined relative to the crank webs of the crank shaft in a direction opposed to the direction of rotation of the crank shaft, a strap mounted for rotation about the eccentric, and a connecting rod having a pivotal connection with the piston and strap and a slotted connection with the said crank pin.

ELIAS G. EBY.